United States Patent [19]

Batson

[11] 4,283,977
[45] Aug. 18, 1981

[54] MOTORIZED MITER CHOP SAW WITH WORK-PIECE CLAMP

[75] Inventor: William A. Batson, Pickens, S.C.

[73] Assignee: The Singer Company, Stamford, Conn.

[21] Appl. No.: 90,713

[22] Filed: Nov. 2, 1979

[51] Int. Cl.³ .............................................. B23D 47/04
[52] U.S. Cl. ........................................ 83/453; 83/463;
 83/464; 83/466; 83/471.2; 83/477.2; 83/490;
 51/217 R; 269/45; 269/203; 269/246
[58] Field of Search ................ 83/452, 453, 454, 463,
 83/466, 471, 471.1, 471.2, 471.3, 472, 473, 477,
 477.2, 490, 491, 574, 581; 269/45, 203, 246, 303,
 315; 51/98 R, 98.5, 125, 125.5, 217 R

[56] References Cited

U.S. PATENT DOCUMENTS

| 359,833 | 3/1887 | Basinger | 269/203 |
|---|---|---|---|
| 556,658 | 3/1896 | Barnes | 83/466 X |
| 2,472,022 | 5/1949 | Neal | 269/249 X |
| 2,812,786 | 11/1957 | Hays | 83/574 X |
| 3,057,240 | 10/1962 | De Witt | 83/490 X |
| 3,358,990 | 12/1967 | Anton | 269/203 X |
| 4,002,094 | 1/1977 | Erickson et al. | 83/471.3 |
| 4,109,901 | 8/1978 | Akin | 83/745 X |

FOREIGN PATENT DOCUMENTS 928601  12/1947  France ........................................ 83/477

Primary Examiner—Frank T. Yost
Assistant Examiner—Robert P. Olszewski
Attorney, Agent, or Firm—Elliot A. Lackenbach; Robert E. Smith; Edward L. Bell

[57] ABSTRACT

A motor operated circular miter chop saw is pivotally mounted on a generally horizontal axle pivot bolt about which it rotates in a vertical plane with the axle pivot bolt being carried by a cast support base structure. Angular orientation of the work-piece is provided by an angularly adjustable fence rotatably carried by the cast base support structure. Clamping means are also provided selectively mountable with the cast support base to provide hold-in clamping action for holding a workpiece against the fence or mountable with the fence to provide hold-down clamping action for holding a workpiece against the cast support base.

6 Claims, 4 Drawing Figures

MOTORIZED MITER CHOP SAW WITH WORK-PIECE CLAMP

DESCRIPTION

1. Field of the Invention

This invention relates to powered miter circular chop saws and a novel workpiece clamp selectively mountable on the fence thereof or mountable on the table thereof and finding particular utility with such a saw having a rotatably positionable fence for cutting elongated stock material such as wood to length at various reproducable angles while enabling the cutting plane of the saw to remain fixed.

2. BACKGROUND OF THE INVENTION

In various crafts projects it is useful to be able to accurately cut elongated stock material, such as strips of wood, or the like, to length and at accurately reproducable angles. For example, in many construction projects it is desired to cut strips of wood so that the end cut is square, that is, perpendicular to the longitudinal axis of the wood strip. At other times it is desirable to cut at angles other than 90° such as at a 45° angle to enable two such strips to be mitered to provide a square or right angle half miter corner joint. Motorized miter saws in which a power driven circular saw is pivotally supported on a support member for vertical swinging movement downwardly from a normal inoperative rest position towards a work support base structure while also pivotally supporting the saw support member on a vertical axis for angular swinging movememt to preselected angular positions to effect a desired angle cutting of the work-piece have been previously shown and saws of this type are disclosed, for example, in Niehaus et al U.S. Pat. No. 3,821,918 and are commonly referred to as chop saws. A disadvantage of such saws is the necessity for pivoting the saw assembly for angular setting and the weight and vibration of the saw necessitates that the saw support member be rather heavy and closely machined to provide for long life and continued accuracy. Among other disadvantages, this necessity makes such construction more expensive than might be otherwise desirable. Moreover, since the saw blade must descend to a position beneath the work supporting surface in order to completely sever the work-piece, means must be provided to enable the saw to pass through the work supporting surface at a number of angular positions which further increases the complexity and, accordingly, the cost of such saws. In some saws this is achieved by providing a rotating platform which rotates with the saw, further adding to the complexity and expense of the machine. If such means are not provided, then a disposable work supporting surface, such as a piece of scrap wood, must be used beneath the work-piece or a movable fence, or the like may be provided to enable relative lateral movement of the work piece and the saw path, therefore necessitating both the chopping movement of the saw and lateral movement of the work-piece or saw which results in a loss of convenience and a possible lessening of accuracy as well as an increase in complexity and expense. In the present saw the difficulties are reduced by providing a pivotal fence for positioning the work-piece and a fixed chordal clearance in the saw base for the saw blade together with means for mounting the fence in position while guiding it for pivotal movement of the saw base enabling a simple chop action of the saw to sever the work-piece at any desired angle while the saw blade always enters the chordal clearance slot.

While such construction has certain advantages over saws having a laterally swingable cutting plane, such saws may, in certain circumstances, prove slightly more awkward and inconvenient to the operator. For example, when long and heavy work-pieces are to be cut at an angle, the necessity to also position the work piece itself at an angle may make the weight of the work piece difficult to balance or support. I have found it desirable, therefore, to provide such saws with an adjustable work-piece clamp selectively usable as a hold-down or as a hold-in.

OBJECTS OF THE INVENTION

Accordingly, it is a primary object of the present invention to provide novel and improved miter saws designed, constructed and arranged to maximize economy of production while simultaneously maintaining good operating convenience, safety and accuracy.

Another primary object of the present invention, in addition to the foregoing object, is the provision of novel and improved miter saws utilizing a cast base structure to which a motor powered circular chop saw is pivotally mounted for rotation about a horizontal axis and a work-piece fence is pivotally mounted for rotation about a vertical axis intersecting the saw axis, together with a work-piece clamp selectively and adjustably carried on the fence.

Yet another primary object of the present invention, in addition to each of the foregoing objects, is the provision of such a miter saw wherein novel and improved mounting means are utilized for selectively mounting the clamp to the fence or to the base support structure so as to enable accurate orientation of the work-piece relative to base support structure and support of the work-piece conveniently even while the fence is rotated or positioned at any desired angular orientation.

Still another primary object of the present invention, in addition to each of the foregoing objects, is the provision of novel and improved motor powered circular miter chop saw of the class described with an angularly adjustable and lockable fence against which a work-piece may be positioned to define the angle of cut thereof, together with a quickly adjustable work-piece clamp selectively carried on either the fence to be effective as a work piece hold down to clamp the work-piece against the saw table or on the table as a work-piece hold-in to clamp the work-piece against the fence.

Yet another and still further primary object of the present invention, in addition to each of the foregoing objects, is the provision in a motor driven circular miter chop saw of the class defined wherein the work-piece clamp is effective and convenient for clamping workpieces of diverse sizes and shapes, including square, rectangular, circular and complex cross-sectional configurations.

The invention resides in the combination, construction, arrangement and disposition of various component paths and elements incorporated in improved motor driven circular miter chop saws and work-piece clamping means therefore constructed in accordance with the principles of this invention. The present invention will be better understood and objects and important features other than those specifically enumerated above will become apparent when consideration is given to the following details and description which, when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiment or modifications are intended to be reserved, especially as they fall within the scope and spirit of the subjoined claims.

SUMMARY OF THE INVENTION

In accordance with the present invention a motor operated circular miter chop saw is pivotally mounted on a generally horizontal axle pin or bolt about which it rotates in a vertical plane with the axle bolt being carried by a cast support base structure. Angular orientation of the work piece is provided by an angularly movable fence rotatably carried by the cast base support structure. Detent means are provided for locating the rotatable fence structure for work-piece cut-off at a right angle or 90° (sometimes referred to as 0° of miter) as well as at 45° right and left orientation. Lock means are also provided for firmly locking the fence in a desired orientation, whether in the detent positions or any position therebetween. A work-piece clamp is also provided which is quickly and easily adjustable and selectively carried on the fence or the table to function as a work-piece hold-down or work-piece hold-in, respectively.

While the saw described is primarily intended for the cutting of soft material such as wood, utilizing a wood cutting blade, it is intended that this application also cover similar devices provided with metal cutting blades, abrasive discs, and the like, for cutting and facing diverse materials.

BRIEF DESCRIPTION OF THE DRAWING

Further objects and features of the present invention will appear from the following description and appended claims when read in conjunction with the accompanying drawing wherein:

DETAILED DESCRIPTION OF THE INVENTION

Figure 1:
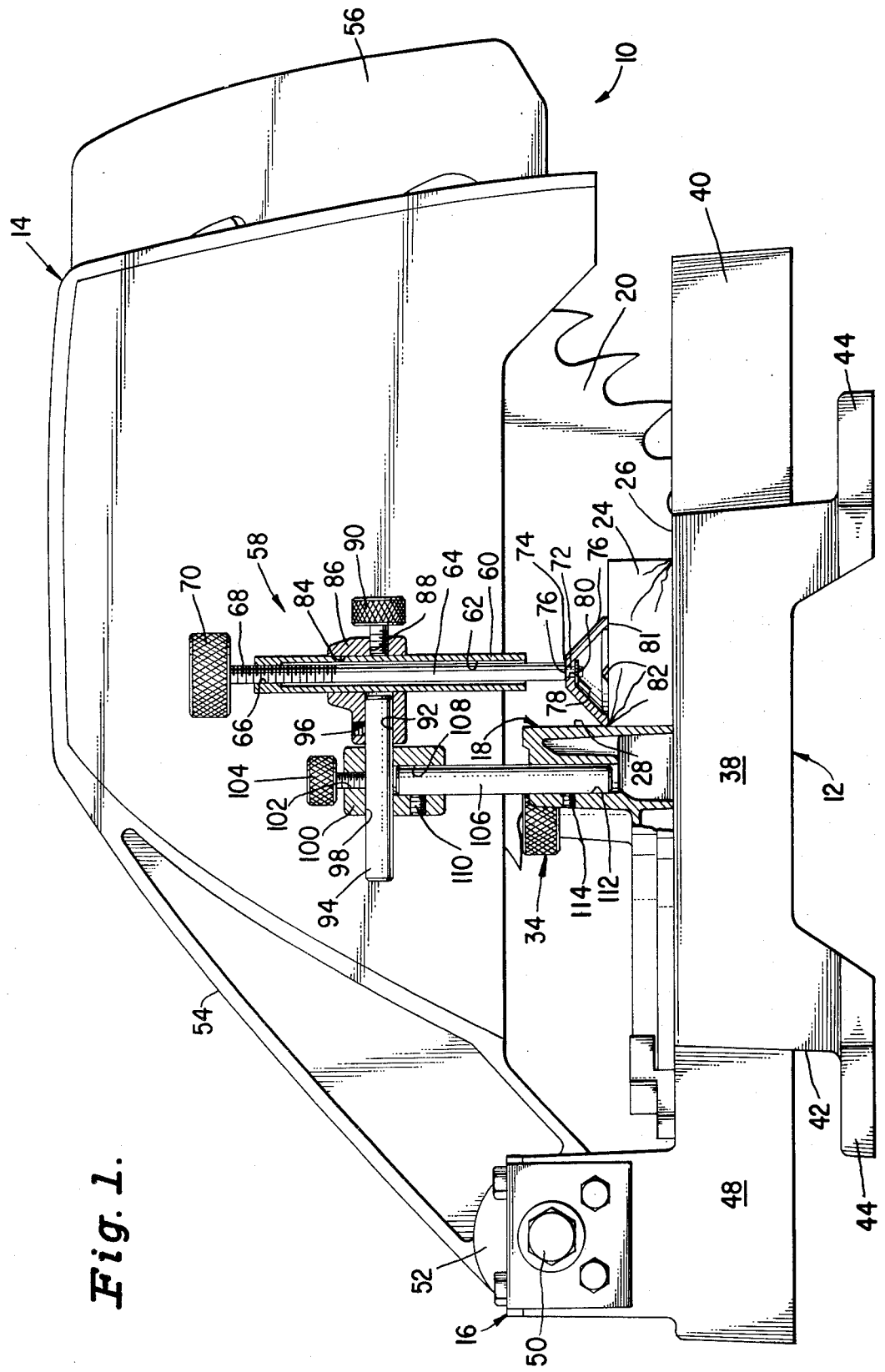
FIG. 1 is a side elevational view, partially broken away, of a motorized circular miter chop saw provided with a work-piece clamp constructed in accordance with the present invention showing the work-piece clamp carried by the fence as a work-piece hold-down.

With reference now to the drawing, wherein like reference characters are utilized for like parts throughout the various views, there is shown and illustrated a motor operated circular miter chop saw constructed in accordance with the principles of the present invention and designated generally by the reference character 10. The miter saw 10 comprises a cast base structure designated generally by the reference character 12, a motor driven circular saw structure designated generally by the reference character 14 rotatably carried on a pivot assembly generally designated by the reference character 16 mounted with the cast base structure 12 and a rotatable fence structure designated generally by the reference character 18 rotatably carried by the cast base structure 12 for limited rotational movement about a vertical pivot located on or adjacent the plane of the circular saw blade 20 of the motor driven circular saw 14. In addition, biasing means (not shown) and more particularly described in detail in my copending application Ser. No. 61,163 filed July 26, 1979, executed by me July 9, 1979, and incorporated herein in its entirety by reference, may be provided for biasing the circular saw 14 in an upward direction towards an open position whereat the circular saw 14 is generally spaced above the cast base portion structure 12 for the insertion of an elongated work-piece 24 therebetween to rest on a work supporting surface 26 defined by the top surface of the cast base portion 12 and against the work supporting face 28 on the fence structure 18 generally perpendicular the work supporting surface 26. A generally arcuate depression or clearance slot 30 is provided in the cast base structure 12 in general alignment with the circular saw blade 20 to enable the circular saw blade 20 to pass through the plane of the work supporting surface 26 as the saw is lowered against the force of the biasing means to cut the work-piece. The fence structure 18 is also provided with a generally central slot 32 to provide clearance for the saw blade 20 for the same purpose, the slot being wide enough to accommodate the saw blade 20 even at the extremes of the fence rotation. Stop means (not shown) such as that also more fully described in my aforesaid copending application may also be provided for limiting the downward pivoting chop motion of the motorized circular saw 14 to prevent the circular saw blade 20 from contacting the bottom of the saw clearance groove 30 or the fence structure 18 rearward of the saw clearance slot 30. Detent means (not shown) may also be provided to quickly and easily locate the fence structure 18 rotatably in any of several preferred positions such as, for example, perpendicular the plane of the saw blade 20 and at 45° angles right and left thereof, and locking means designated generally by the reference character 34 are also provided for positively locking the fence structure 18 in a desired angular orientation.

In addition to the upper work supporting surface 26, the cast base structure 12 further comprises a pair of side walls 38, a curved front wall 40 and a rear wall 42, each depending therefrom with laterally outwardly extending feet 44 being integral with the lower edges of the walls 38, 40 and 42 at the four corners for supporting the miter chop saw 10 on a table, or the like. Mounting apertures 46 are provided in each foot 44 to enable the miter chop saw 10 to be fastened rigidly in position. Projecting generally rearwardly of the rear wall 42 of the cast base structure 12 and forming an integral part thereof, there is provided a generally U-shaped channel portion 48 extending upwardly above the plane of the work supporting surface 26 to define a pair of mounting ears forming a part of the circular saw mounting means 16.

As heretofore pointed out, the circular saw structure 14 is pivotally mounted, and the support means 16 therefore comprises a pin or pivot bolt 50 extending through the side wall 48 and adjustably mounted therein as is described in more detail in my aforesaid copending application incorporated herein by reference. The bolt 50, as set forth therein extends through a boss 52 integrally formed with a blade guard and motor supporting casting 54 forming the main supporting structure of the circular saw structure 14. The blade guard casting 54 has an electric motor (not shown) mounted to one side thereof for driving the circular saw blade 20 and crries a handle portion 56 for enabling the circular saw assembly 14 to be controlled, i.e., lowered for cutting action and raised.

As heretofore pointed out, the motorized miter chop saw of the present invention utilizes a rotatably mounted fence 18 with a work-piece 24 being positioned against the front face 28 of the fence 18 and supported on the work supporting surface 26. Especially in the case of a very long work piece, imbalance of the work piece may make it difficult to support the work piece as desired for safe and accurate cutting. Accordingly, and in accordance with the present invention, the miter saw 10 is further provided with a work clamp, designated generally by the reference character 58 which may be quickly and easily associated with and adjusted relative to either the fence 18 or the work supporting surface 26 so as to clamp the work-piece 24 into the table 26 or the front face 28 of the fence 18. Accordingly, and with particular now to FIG. 1, the clamp 58 is shown and illustrated associated with the fence 18 so as to operate as a hold-downn clamp, clamping the work-piece 24 against the work supporting surface 26.

The work clamp 58, in accordance with the present invention comprises an elongated tubular clamp sleeve 60 having a longitudinal bore 62 therewithin and a clamping spindle 64 extending through the hollow bore 62. The upper end of the elongated clamp sleeve or tube 60 is of a reduced internal diameter and internally threaded, as indicated by the reference character 66 while the upper end portion of the spindle 64 is likewise screw threaded, as indicated by the reference character 68 for jack screw cooperation therewith. The upper end portion of the spindle 64 is provided with a knurled thumb piece 70.

The lower end portion of the spindle 64 has a reduced diameter portion 72, terminating in a shoulder 74. A generally cup-shaped clamping member or pad 76 having a generally central aperture 78 is fit over the reduced diameter portion 72 and rotatably held in position thereon against the shoulder 74, as by means of a split washer 80. The lower end portion of the cup-shaped clamp member 76 is generally hollow and open, as shown, having a generally annular flat rim 81 provided with a V-shaped notch 82. Hence, the cup-shaped clamp member may be securely engaged against a flat work piece, as shown, or the notch 82 thereof may be utilized to engage a curved surface work piece without slippage. As will be readily apparent, rotational movement of the knurled thumb piece 70 is effective to advance and retract the spindle 64 and associated clamp member 76 relative the hollow clamp sleeve or tube 60.

The clamp sleeve or tube 60, which is preferably of generally circular cylindrical configuration, is received in a bore 84 provided with an adjustment or clamp block 86 and a first cross bore 88 communicates with the bore 84, the first cross bore 88 being internally screw threaded, as shown, for receipt of a knurled threaded thumb screw 90. Accordingly, if the knurled threaded thumb screw 90 is unscrewed slightly, the sleeve 60 may be rapidly moved within the bore 84 to quickly position the clamp member 76 against a work piece 24 or remove the clamp member 76 from engagement therewith. Once positioned in engagement against the work piece 24, the clamp member 76 may be quickly tightened thereagainst by means of a slight rotation of the knurled thumb piece 70.

The clamp block 86 is further provided with a second bore 92 which also extends generally perpendicular the spindle bore 84 and a support bar or stub shaft 94 preferably of generally circular cylindrical configuration is inserted within the bore 92 and clamped in position therewithin, as by means of a set screw 96. The bar 94, in turn, is carried within a bore 98 of a clamp mounting block 100 so as to be slidable and rotatable therewithin for quick and rapid positioning of the clamp 58. To lock the support bar or stub shaft 94 in a desired position within the bore 98, the clamp mounting block 100 is further provided with a first threaded cross bore 102 and a locking knurled threaded thumb screw 104 similar to the thumb screw 90 carried in the first threaded cross bore 102.

The clamp mount block 100 is in turn structurally associated with the fence 18, as by means of a generally vertical fixed support shaft 106, which may be of generally circular cylindrical configuration having its upper end portion mounted within a bore 108 in the clamp mount block 100 and locked in position therein, as by means of a set screw 110. The lower end portion of the shaft 106 is mounted within a bore 112 provided on the fence 18 and held in position therewithin, as by means of a set screw 114.

As heretofore pointed out, the work-piece clamp 58 has utility not only as a hold-down while mounted on the fence 18 but is also adapted to be structurally associated with the table 12 and selectively positioned relative thereto so as to be effective to operate as an adjustable work-piece hold-in, for clamping a work piece 24 against the face 28 of the fence 18, regardless of the angular orientation of the fence 18 on the table or cast support structure 12.

Figure 2:
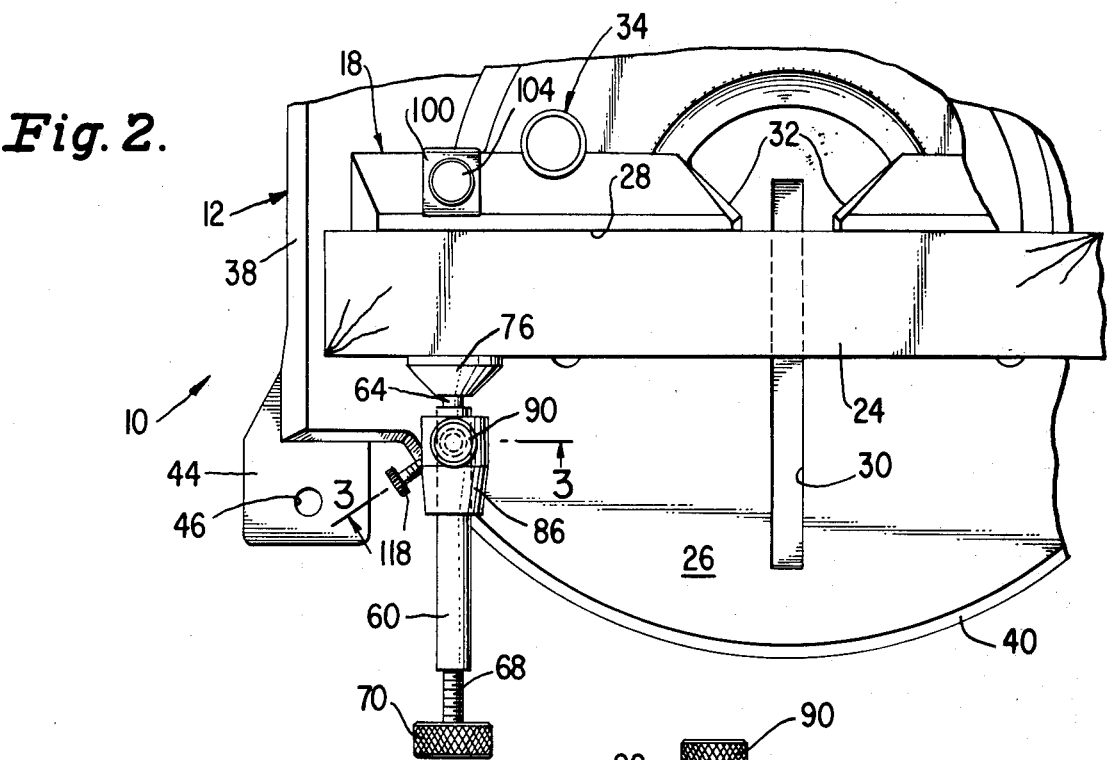
FIG. 2 is a top plan partial view of the chop saw shown in FIG. 1 with the saw housing and blade removed showing the work-piece clamp carried by the table as a work-piece hold-in in a first position of the fence for right angle cut off of the work-piece.
Figure 3:
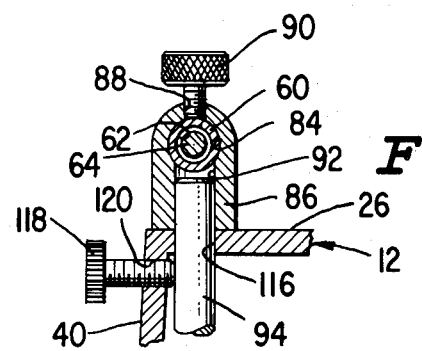
FIG. 3 is a partial elevational view of the base portion and the clamp of the preceding view, viewed along line 3—3 of FIG. 2.
Figure 4:
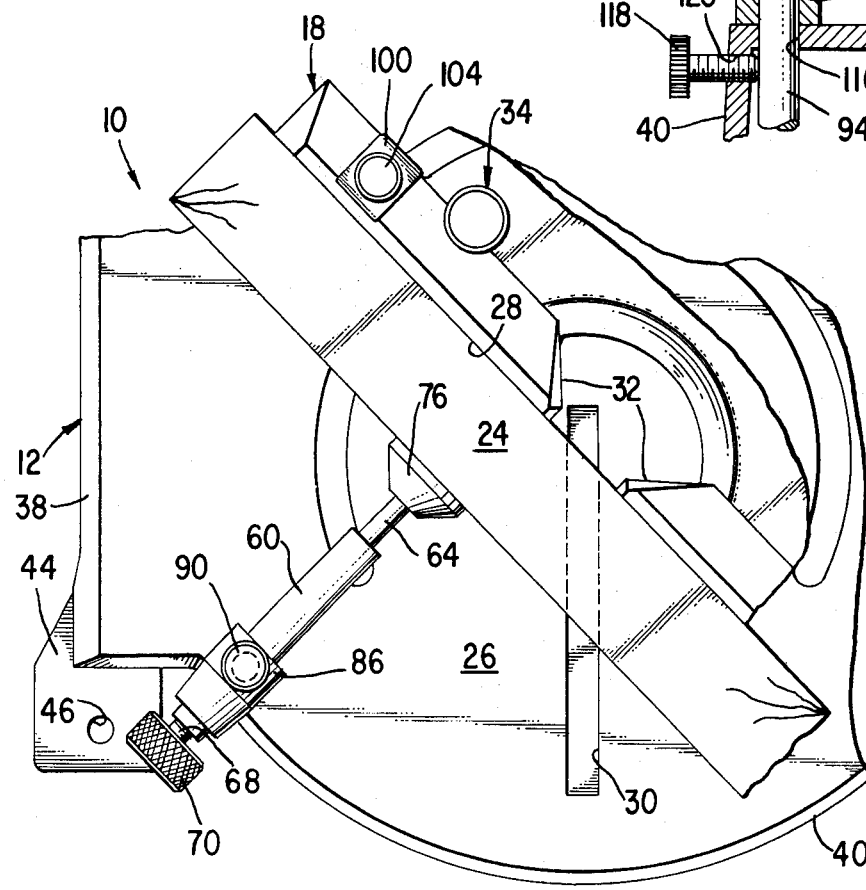
FIG. 4 is a top plan partial view similar to FIG. 2 showing the work piece clamp and fence in a further orientation for angular cut-off of the work-piece, as at a 45° angle for construction of a right angle miter joint.

Accordingly, and with reference more particularly to FIGS. 2 through 4, the table or cast support structure 12 is specifically constructed and arranged so as to enable the clamp 58, and particularly the clamp block 86, stud shaft 94, spindle tube or sleeve 60 and spindle 64 to be selectively mounted and oriented relative thereto. Accordingly, the table or cast base structure 12, generally adjacent the curved forward wall 40, is provided with one or more generally vertically extending bores 116 (see FIG. 3) into which the stud shaft 94 may be inserted, and locked in position, as by means of a knurled threaded thumb screw 118 engaged within a threaded bore 120 provided in the front wall 40 generally adjacent the work supporting surface 26 and in axial alignment with the bore 116. As seen, positioning the stud shaft 94 in a vertical direction, as indicated in FIGS. 2-4, positions the clamp tube or sleeve 60 generally horizontal and parallel the work surface 26 so that it may be angularly oriented so as to be perpendicular the fence front surface 28 of the fence 18 or, for tapered pieces, or the like, at any desired angle relative thereto whether the fence is positioned for right angle cut off, as shown and illustrated in FIG. 2, for 45° miter cut off as shown and illustrated in FIG. 4, or at any angle intermediate thereto. The knurled threaded thumb screws 90 and 118 enable the clamp 58 to be quickly positioned as desired, after which it may be quickly tightened, by turning the thumb piece 70.

It is to be understood that the invention is by no means limited to the forms of embodiment described and illustrated, which have been given by way of example only. In particulate, it comprises all the means constituting technical equivalents to the means described as well as their combinations, should the latter be carried out according to the spirit of the invention.

I claim:

1. Miter saw comprising a cast base structure having a generally planar work support surface to which a motor powered circular chop saw is pivotally mounted for rotation about an axis generally parallel said work support surface and a work-piece positioning fence pivotally carried by said base support structure for rotation about an axis generally perpendicular to both said surface and said first mentioned axis, together with a single clamping means movably mountable for selectively clamping a work-piece in either a hold-in arrangement against said fence or in a hold-down arrangement against said work support surface, said fence being constructed and arranged to include means for enabling said clamping means to be mounted therewith for said hold-down arrangement and said cast base structure being constructed and arranged to include means for enabling said clamping means to be mounted therewith for said hold-in arrangement.

2. Miter saw defined in claim 1 wherein said means for mounting said clamping means with said fence comprises a clamp mount positioned generally above said fence and mounted thereto by means of a generally rigid shaft extending therebetween and fixedly mounted with said fence and said clamp mount, said clamp mount being provided with a bore extending therethrough generally parallel said work support surface.

3. Miter saw defined in claim 1 wherein said means for mounting said clamp with said cast base structure comprises a bore extending through said work support surface generally perpendicular thereto.

4. Miter saw defined in either of claims 2 or 3 further comprising a locking screw fitted engaged with the wall of said bore and extending generally perpendicular thereto to enable a stud shaft threaded into said bore from said clamp means to be locked therein.

5. Miter saw defined in claim 1 wherein said clamping means comprises a clamp block having a pair of generally perpendicular bores, a stud shaft fixedly mounted in one of said bores and a hollow spindle tube slidably disclosed in the other said bore and lockable relative thereto, said hollow spindle tube having a bore therethrough threaded at at least one longitudinally extending portion thereof and provided with a clamping spindle movable within said bore and threadedly engaged therewith to project outwardly thereof, one outwardly projecting portion of said spindle being provided with a knurled thumb piece portion, the other outwardly projecting portion thereof being provided with a clamping member or pad.

6. Miter saw defined in claim 5 wherein said clamping pad is of generally conical configuration, rotatable on said spindle and provided with a generally V-shaped notch and a generally flat annular surface at the distal end thereof for engagement with a work-piece, whether flat surfaced or of curvilinear surface configuration.

* * * * *